United States Patent
Yamasaki et al.

(10) Patent No.: US 8,386,671 B2
(45) Date of Patent: Feb. 26, 2013

(54) COMMUNICATION SYSTEM, COMMUNICATION DEVICE AND COMMUNICATION METHOD

(75) Inventors: Miki Yamasaki, Fukuoka (JP); Kazuhisa Obuchi, Kawasaki (JP); Yoshiharu Tajima, Kawasaki (JP); Yoshinori Soejima, Fukuoka (JP); Manabu Kubota, Fukuoka (JP); Chiaki Shinohara, Fukuoka (JP); Shinya Okamoto, Fukuoka (JP); Akihide Otonari, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 125 days.

(21) Appl. No.: 13/064,312

(22) Filed: Mar. 17, 2011

(65) Prior Publication Data

US 2011/0164694 A1    Jul. 7, 2011

Related U.S. Application Data

(63) Continuation of application No. PCT/JP2008/067019, filed on Sep. 19, 2008.

(51) Int. Cl.
*G06F 3/00* (2006.01)
*G06F 5/00* (2006.01)
(52) U.S. Cl. .......................... 710/57; 710/52
(58) Field of Classification Search .............. 710/52, 710/57
See application file for complete search history.

(56) References Cited

U.S. PATENT DOCUMENTS

| 6,529,518 B1 * | 3/2003 | Webber ................. 370/403 |
| 2006/0114821 A1 | 6/2006 | Willey et al. |
| 2008/0165888 A1 * | 7/2008 | Wiggins et al. ............ 375/295 |

FOREIGN PATENT DOCUMENTS

| JP | 63-209247 | 8/1988 |
| JP | 7-283817 | 10/1995 |
| JP | 2000-069163 | 3/2000 |
| JP | 2000-244521 | 9/2000 |
| JP | 2002-314593 | 10/2002 |
| JP | 2003-60695 | 2/2003 |
| JP | 2004-179917 | 6/2004 |
| JP | 2005-244505 | 9/2005 |
| JP | 2006-157912 | 6/2006 |

(Continued)

OTHER PUBLICATIONS

"Evolved Universal Terrestrial Radio Access (E-UTRA) and Evolved Universal Terrestrial Radio Access Network (E-UTRAN); Overall description; Stage 2"; 3GPP, TS36.300, V8.0.0, Mar. 2007; May 2008; (pp. 1-82).

(Continued)

*Primary Examiner* — Chun-Kuan Lee
*Assistant Examiner* — David Martinez
(74) *Attorney, Agent, or Firm* — Staas & Halsey LLP

(57) ABSTRACT

A communication system includes a first communication device that transmits transmission data containing user data and control data, and a second communication device that receives the transmission data from the first communication device. The second communication device includes a temporary storing unit that temporarily stores therein the received transmission data, and a space-insufficient-information transmitting unit that transmits, when an amount of the transmission data stored in the temporary storing unit exceeds a first threshold, space insufficient information indicating that available storage space of the temporary storing unit is insufficient to the first communication device. The first communication device includes a transmission control unit that transmits, when receiving the space insufficient information from the second communication device, transmission data excluding the user data from the transmission data to the second communication device, and that resumes, when receiving space-insufficient dissolution information from the second communication device, transmission of the user data.

6 Claims, 10 Drawing Sheets

FOREIGN PATENT DOCUMENTS

| | | |
|---|---|---|
| JP | 2008-099186 | 4/2008 |
| WO | 2008/004301 A1 | 1/2008 |

OTHER PUBLICATIONS

International Search Report for PCT/JP2008/067019, mailed Dec. 9, 2008.

Japanese Office Action mailed Mar. 21, 2012 issued in corresponding Japanese Patent Application No. 2010-529546.
Japanese Office Action mailed Jul. 24, 2012 issued in corresponding Japanese Patent Application No. 2010-529546.

* cited by examiner

COMMUNICATION SYSTEM, COMMUNICATION DEVICE AND COMMUNICATION METHOD

CROSS-REFERENCE TO RELATED APPLICATION

This application is a continuation of International Application No. PCT/JP2008/067019, filed on Sep. 19, 2008, the entire contents of which are incorporated herein by reference.

FIELD

The embodiments discussed herein are directed to a communication system, a communication device, and a communication method.

BACKGROUND

As illustrated in FIG. 7, a wireless communication system Sa for mobile phones is constituted of an IP network that includes a switching center 300a, such as a Mobility Management Entity (MME)/Serving Gateway (S-GW), that is connected to an Internet Protocol (IP) network 400a and multiple base stations (eNB: evolved Node B) 200a that are connected to the switching center 300a.

With each wireless communication apparatus (hereinafter, referred to as a "user terminal (UE)"), such as mobile phones, data transmission is performed with another user terminal 100a via the nearest base station 200a.

A communication specification called Long Term Evolution (LTE) is actively studied as a new standard used in such a wireless communication system Sa. LTE has been drawing attention in the $3^{rd}$ Generation Partnership Project (3GPP) that is one of a communication standardization projects. For example, improvement of layer 2 corresponding to data link layer is enhanced. (see, for example, "Evolved Universal Terrestrial Radio Access (E-UTRA) and Evolved Universal Terrestrial Radio Access (E-UTRAN); Overall description; Stage 2" 3GPP, TS36.300, http://www.3gpp.org/ftp/Specs/archive/36series/36.300/36300-850.zip).

As illustrated in FIG. 8, layer 2 of LTE has three sublayers, i.e., a Packet Data Convergence Protocol (PDCP) layer, a Radio Link Control (RLC) layer, and a Medium Access Control (MAC) layer. A user terminal 100 and a base station 200 each have Layer 2.

A PDCP entity and an RLC entity belonging to the PDCP layer and the RLC layer, respectively, are present in accordance with the number of logical channels (LCH) (n in FIG. 8) that are used for radio communication, and each of them are associated with each other.

In each of the n PDCP entities, a header of the PDCP layer is added to transmission data, and then a Protocol Data Unit (PDU) of the obtained PDCP layer is output to the associated RLC entity.

This PDU becomes, in the RLC layer, a Service Data Unit (SDU). The PDU of the RLC layer is obtained by adding a header of the RLC layer by each RLC entity.

In other words, if a PDU of an upper sublayer is output to a lower sublayer, it is treated as a SDU of the lower sublayer. Then, if a header for each sublayer is added to the SDU in the lower sublayer, a PDU of the lower sublayer is obtained.

If a PDU of the RLC layer (hereinafter, referred to as an "RLC-PDU") is output from each RLC entity to the MAC layer, each of the RLC-PDUs is multiplexed. Then, by adding a header of the MAC layer, the multiplexed RLC-PDU becomes a PDU of the MAC layer (hereinafter, referred to as a "MAC-PDU") and is subjected to a process of layer 1 corresponding to the physical layer.

At this time, by using a bandwidth that can be used for data transmission or a radio resource, such as electrical power, an MAC entity belonging to the MAC layer determines free space for the MAC-PDU, appropriately allocates the RLC-PDU that is output from each of the n RLC entities to free space of the MAC-PDU, and performs multiplexing.

For example, as illustrated in FIG. 9, in the MAC layer, an RLC-PDU that is obtained by adding an RLC header to an SDU in a first RLC entity (hereinafter, referred to as an "RLC #1") and an RLC-PDU that is obtained by adding an RLC header to an SDU in a second RLC entity (hereinafter, referred to as an "RLC #2") are multiplexed by being treated as an MAC-SDU.

A header (MAC header) for the MAC layer or control data is added to each of the two multiplexed MAC-SDUs (user data), thereby the MAC-SDUs each obtain the MAC-PDU (transmission data). Then, the obtained transmission data is transmitted after a process of layer 1 (not illustrated) is performed thereon. Specifically, this transmission data is transmitted between the user terminal 100a and the base station 200a each other.

Furthermore, in the MAC layer, re-transmission control according to a hybrid automatic repeat request (HARQ) using a Stop-and-Wait method consisted of n channels is also executed.

In the HARQ operation in the MAC layer, transmission data is held at the time of transmission, an error correction process and a process for coding a cyclic redundancy check (CRC) is performed on the transmission data.

Then, if a result of receiving the transmission data indicates a reception error (i.e., an error detection result of the CRC coding indicates negative), a receiving end replies a negative acknowledgment (NACK) indicating that status to a transmission end. In contrast, if reception is acceptable (i.e., an error detection result of the CRC code indicates positive), the receiving end replies an ACK indicating that status to the transmitting side.

Thereafter, if the MAC layer of the transmission end receives an NACK, the MAC layer re-transmits the transmission data that is held at the time of initial transmission. If the MAC layer of the transmission end receives an ACK, the MAC layer cancels the MAC-PDU that is held at the time of initial transmission and transmits the subsequent MAC-PDU.

Then, as illustrated in FIG. 10, with the user terminal 100a and the base station 200a having the above-described layer 2, two-way transmission is performed on transmission data between each of the MAC layers of the base station 200a and the user terminal 100a.

As illustrated in FIG. 10, the base station 200a and the user terminal 100a each include a PDCP layer, an RLC layer, and an MAC layer belonging to layer 2. Furthermore, each of the PDCP layer and the RLC layer includes buffers that temporarily store therein various data received from upstream of the transmission path for the transmission data.

As illustrated FIG. 11, with such a communication system Sa, for example, if an application 500a having low throughput is connected to the user terminal 100a (see (1) of FIG. 11), transmission of the transmission data from the PDCP layer of the user terminal 100a to the application 500a is performed at a lower transfer rate than that of the transmission data from the base station 200a to the user terminal 100a (see (2) of FIG. 11).

Accordingly, at a receiving unit in the user terminal 100a, an overflow of transmission data occurs in the buffer in the PDCP layer (3), thereby there may be a case in which the transmission data cannot be transmitted to the application.

In such a case, the PDCP layer of the user terminal 100a notifies a higher-level transmission data control unit (e.g., a radio resource control (RRC)) 600a of that status. Then, by transmitting a transmission stop request for the transmission data from the RRC 600a to the MAC layer of the base station 200a (see (4) of FIG. 11), transmission of the transmission data from the base station 200a is stopped (see (5) of FIG. 11), thus eliminating the overflow of the buffer (see, for example, Japanese Laid-open Patent Publication No. 2006-157912 and Japanese Laid-open Patent Publication No. 2005-244505).

However, with the conventional communication system Sa, if the base station 200a receives, from the user terminal 100a, the transmission stop request of the transmission data, the base station 200a stops the transmission of the transmission data to the user terminal 100a; however, in such a case, the user terminal 100a cannot receive, from the base station 200a, user data contained in the transmission data nor control data. This control data contains an RLC-control PDU (ACK, NACK, etc.).

Accordingly, because the user terminal 100a cannot receive an ACK nor an NACK associated with data that is transmitted from the user terminal 100a to the base station 200a, the user terminal 100a cannot confirm the delivery of the data that is transmitted from the user terminal 100a. Therefore, as illustrated in (6) of FIG. 11, the RLC layer cannot transmit the transmission data to the base station 200a.

In this way, a case in which the transmission data cannot be transmitted is not limited to occurring in the user terminal 100a; it may also occur in the base station 200a. For example, if a throughput of an IP network 400a that is connected to the base station 200a via the switching center 300a is relatively low, in a similar manner as in the user terminal 100a described above, an overflow of transmission data occurs in the buffer in the PDCP layer of the base station 200a, thereby there may be a case in which transmission of the transmission data stops between the base station 200a and the user terminal 100a.

SUMMARY

According to an aspect of an embodiment of the invention, a communication system includes a first communication device that transmits transmission data containing user data and control data, and a second communication device that receives the transmission data from the first communication device. The second communication device includes a temporary storing unit that temporarily stores therein the received transmission data, and a space-insufficient-information transmitting unit that transmits, when an amount of the transmission data stored in the temporary storing unit exceeds a first threshold, space insufficient information indicating that available storage space of the temporary storing unit is insufficient to the first communication device. The first communication device includes a transmission control unit that transmits, when receiving the space insufficient information from the second communication device, transmission data excluding the user data from the transmission data to the second communication device, and that resumes, when receiving space-insufficient dissolution information from the second communication device, transmission of the user data.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Preferred embodiments of the present invention will be explained with reference to accompanying drawings. The present invention is not limited to the embodiments. In the following embodiments, a description is given of a case in which the present invention is applied to a communication system of a mobile phone.

[a] First Embodiment

Figure 1:
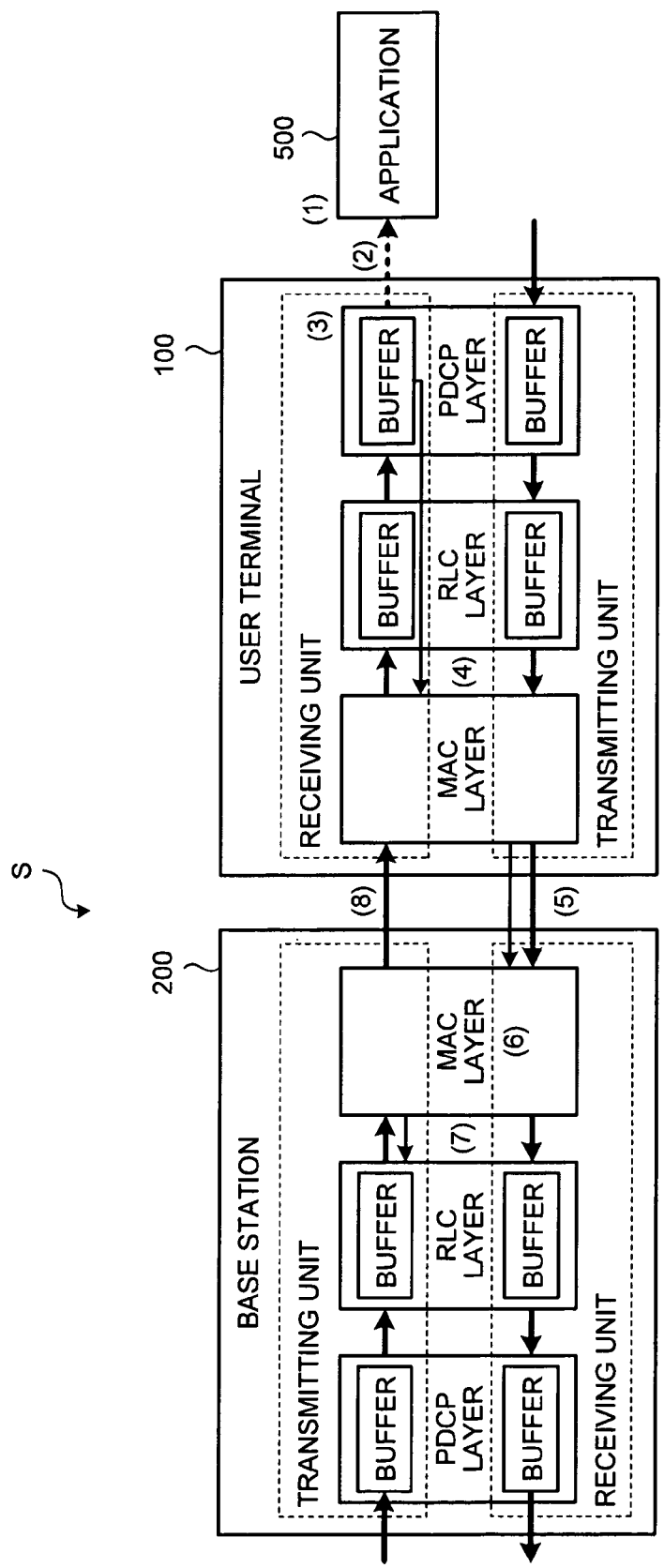
FIG. 1 is a schematic diagram illustrating the flow of transmission data in a communication system according to a first embodiment.

As illustrated in FIG. 1, a communication system S according to a first embodiment includes a user terminal 100 and a base station 200 as an example of a pair of communication devices for transmitting/receiving communication data that includes both user data and control data. In the following description, because each communication data is data that is transmitted in one direction, the communication data that includes both the user data and the control data is referred to as transmission data.

The user terminal 100 and the base station 200 each include layer 2 of Long Term Evolution (LTE). Each layer 2 thereof has three sublayers, i.e., a Packet Data Convergence Protocol (PDCP) layer, a Radio Link Control (RLC) layer, and a Medium Access Control (MAC) layer. Furthermore, each of the PDCP layer and the RLC layer includes buffers that temporarily store therein various data received from upstream of a transmission path of the transmission data.

In particular, this communication system S is configured such that, when the transmission data is transmitted/received between the user terminal 100 and the base station 200, even when the transmission data whose amount exceeds a predetermined amount is stored in a buffer in the PDCP layer in the user terminal 100, the transmission of the transmission data from the user terminal 100 to the base station 200 is not unnecessarily stopped.

In the following, in this communication system S, by using an example of a case in which the user terminal 100 is connected to a relatively low throughput application 500, the flow of a communication method of not unnecessarily stopping, even when the transmission data whose amount exceeds a predetermined amount is stored in the buffer in the PDCP layer in the user terminal 100, the transmission of the transmission data from the user terminal 100 to the base station 200 will be described.

As illustrated in FIG. 1, if the user terminal 100 is connected to the relatively low throughput application 500 (see (1) of FIG. 1), a transfer rate of the transmission data between the user terminal 100 and the application 500 is lower than that between the base station 200 and the user terminal 100 (see (2) of FIG. 1).

Accordingly, because the amount of transmission data that is transmitted from the RLC layer of the user terminal 100 is greater than that is to be transmitted to the application 500, the amount of transmission data to be stored in the buffer in the PDCP layer of the user terminal 100 increases and thus approaches to the upper limit of the storage space (see (3) of FIG. 1).

If the amount of transmission data stored in the buffer exceeds a first threshold, the PDCP layer of the user terminal 100 notifies the MAC layer of the user terminal 100 of it Via the RLC layer of the user terminal 100 (see (4) of FIG. 1). If the MAC layer of the user terminal 100 receives this notification, it transmits, to the base station 200, space insufficient information indicating insufficiency of the storage space of the buffer in the PDCP layer of the user terminal 100 (see (5) of FIG. 1). This space insufficient information is transmitted by being stored in a header portion of control data or user data to be transmitted from the user terminal 100 to the base station 200.

By receiving the space insufficient information, the MAC layer of the base station 200 recognizes that the transmission data is retained in the buffer in the PDCP layer of the user terminal 100. Then, when the MAC layer of the base station 200 transmits, to the RLC layer of the base station 200, a transmission request for the transmission data, the MAC layer of the base station 200 requests, from the RLC layer of the base station 200, to transmit the transmission data that contains only the control data excluding the user data (see (7) of FIG. 1).

If the RLC layer of the base station 200 receives, from the MAC layer of the base station 200, the transmission request for the transmission data excluding the user data, it creates transmission data that contains the control data excluding the user data and transmits that transmission data to the user terminal 100 via the MAC layer of the base station 200. It is also possible to configure the communication system S such that a reception stop request for data is transmitted from the MAC layer of the base station 200 to the PDCP layer of the base station. With this configuration, even if the RLC layer of the base station 200 stops transmission of the user data to the MAC layer of the base station 200, an overflow of data does not occur in the buffer in the PDCP layer of the base station 200.

As described above, with the communication system S according to the first embodiment, even if a temporary storing unit (here, the buffer in the PDCP layer of the user terminal 100) in a communication device (here, the user terminal 100) that receives transmission data transmitted from the base station 200 stores therein transmission data whose amount exceeds a predetermined amount, a communication device (here, the base station 200) that transmits the transmission data stops the transmission of the user data but does not stop the transmission of the control data. Accordingly, the communication device (here, the user terminal 100) that receives the transmission data can confirm, using the received control data, the delivery of transmission data that is transmitted from its own device. This makes it possible to perform continuous transmission without unnecessarily stopping the transmission of the transmission data to the base station 200.

In the first embodiment, the communication system S can be configured such that, when the base station 200 continues the transmission of the control data and if it receives information indicating that space of the user terminal 100 is insufficient, the base station 200 temporarily stop a the transmission until it receives space-insufficient dissolution information from the user terminal 100 and again starts transmission of data including the user data when it receives transmission restart information. At this time, the communication system S can also be configured such that a buffer monitoring unit 115*a* of the user terminal 100 monitors available storage space of the buffer becoming equal to or lower than a second threshold, and the user terminal 100 transmits the space-insufficient dissolution information to the base station 200.

In the following, the configuration of layer 2 included in each of the user terminal 100 and the base station 200 will be specifically described with reference to FIG. 2. As described in FIG. 2, layer 2 has a PDCP layer (PDCP sublayer) 110, an RLC layer (RLC sublayer) 120, and an MAC layer (MAC sublayer) 130. Furthermore, layer 2 has a plurality of logical channels. The PDCP sublayer 110 and the RLC sublayer 120 are present in each logical channel. Because the other configurations are the same as a known transmitting device that has a multiple layers, a description thereof will be omitted here.

Furthermore, the flow of the transmission data that is transmitted/received among the PDCP sublayer 110, the RLC sublayer 120, and the MAC sublayer 130 of layer 2 according to the first embodiment is the same as that described above in the "BACKGROUND".

The PDCP sublayer 110 is a layer that transmits/receives user data (IP packet) between a network layer corresponding to an upper layer of the PDCP sublayer 110 or that transmits/receives control data between a radio resource control (RRC) corresponding to layer 3. The PDCP sublayer 110 transmits/receives data between the RLC sublayer 120 corresponding to a lower sublayer using a PDCP-PDU.

The PDCP sublayer 110 performs, with respect to the user data, a compressing/decompressing process on an IP header, concealment processing, an SDU discard process and performs, with respect to the control data, concealment processing, "integrity protection", and so on.

Figure 2:
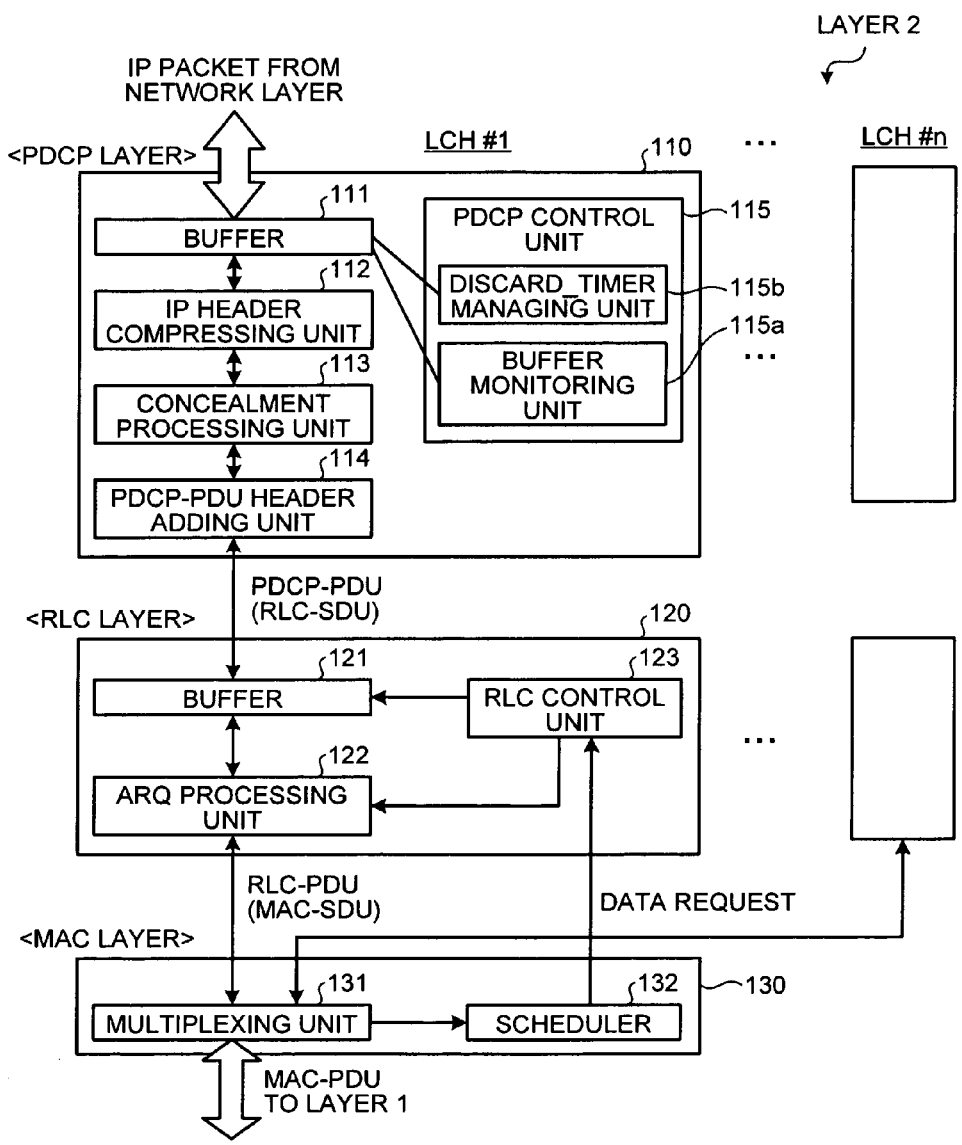
FIG. 2 is a functional block diagram illustrating layer 2 included in each of a user terminal and a base station according to the first embodiment.

As illustrated in the upper part of FIG. 2, the PDCP sublayer 110 has a buffer 111, an IP header compressing unit 112, a concealment processing unit 113, a PDCP-PDU header adding unit 114, and a PDCP control unit 115.

The buffer 111 receives an IP packet from the network layer and stores therein a PDCP-SDU that is converted by the PDCP control unit 115.

The IP header compressing unit 112 obtains the PDCP-SDU from the buffer 111 and compresses the IP header contained in the obtained PDCP-SDU. The concealment processing unit 113 obtains, from the IP header compressing unit 112, the PDCP-SDU whose IP header is compressed and then performs various kinds of concealment processing.

The PDCP-PDU header adding unit 114 obtains the PDCP-SDU from the concealment processing unit 113 and creates a PDCP-PDU by adding a control header to the obtained PDCP-SDU. The control header that is added to the PDCP-SDU at this stage contains a sequence number for identifying the sequence of each PDCP-SDU. The PDCP-PDU header adding unit 114 outputs, to the RLC sublayer 120, the PDCP-PDU to which the control header is added.

The PDCP control unit 115 performs the overall control of the PDCP sublayer. In particular, the PDCP control unit 115 has the buffer monitoring unit 115a that monitors the amount of data (PDCP-SDU) stored in the buffer 111. If the amount of the data stored in the buffer 111 exceeds the first threshold, by storing, in a header of the PDCP-SDU or the PDCP-SDU, space insufficient information indicating that available storage space of the buffer 111 is insufficient, the PDCP control unit 115 controls the output of the information from the PDCP sublayer 110 to the RLC sublayer 120.

In contrast, if the insufficiency of available storage space of the buffer 111 is dissolved by the buffer monitoring unit 115a, the PDCP control unit 115 controls the output of the space-insufficient dissolution information indicating that status from the PDCP sublayer 110 to the RLC sublayer 120. The communication system S can also be configured such that, to determine whether the insufficiency of the buffer space is dissolved at this time, the buffer monitoring unit 115a in the user terminal 100 monitors available storage space of the buffer being equal to or lower than the second threshold, and the user terminal 100 transmits transmission restart information to the base station 200.

Furthermore, the PDCP control unit 115 has a Discard_Timer managing unit 115b and allows the Discard_Timer managing unit 115b to be started for each IP packet of user data when the user data (IP packet) is received from the upper layer. If an IP packet of target user data is present in the PDCP sublayer 110 when time-out occurs or if the ARQ process has not been started in the RLC sublayer 120, the PDCP control unit 115 discards the IP packet of the target user data.

Furthermore, if the transmission data (PDCP-PDU) is input from the RLC sublayer 120 to the PDCP sublayer 110, the buffer 111, the IP header compressing unit 112, the concealment processing unit 113, the PDCP-PDU header adding unit 114, and the PDCP control unit 115 performs the above described process in the reverse order.

In the following, the RLC sublayer 120 will be described. The RLC sublayer 120 is a layer that performs a re-transmission control of data obtained by an ARQ. As illustrated in the middle portion of FIG. 2, the RLC sublayer 120 has a buffer 121, an ARQ processing unit 122, and an RLC control unit 123.

The buffer 121 reconstructs the PDCP-PDU obtained from the PDCP sublayer 110 to an RLC-SDU in accordance with the content of the control header of the PDCP-PDU and then stores therein the reconstructed RLC-SDU. Furthermore, the buffer 121 identifies an RLC-SDU by setting, for example, a flag to the RLC-SDU that is transmitted, even once by the ARQ processing unit 122, to the associated station.

The ARQ processing unit 122 obtains, from the buffer 121, multiple RLC-SDUs, creates RLC-PDUs, and outputs the RLC-PDUs to the MAC sublayer 130, thereby forwarding the RLC-PDUs to the RLC sublayer of the associated station. Furthermore, if the ARQ processing unit 122 performs the ARQ process and confirms the transmission between the RLC sublayer of the associated station, the ARQ processing unit 122 outputs delivery confirmation information to the PDCP sublayer 110.

If the ARQ processing unit 122 confirms the transmission, by outputting, to the PDCP sublayer 110, the sequence number contained in the PDCP-PDU associated with the confirmed, it is also possible to send information indicating confirmation of the transmission to the PDCP sublayer 110.

The RLC control unit 123 performs the overall control of the RLC sublayer 120. For example, if the RLC control unit 123 obtains a data request from the MAC sublayer 130, the RLC control unit 123 allows the MAC sublayer 130 to output the amount of the requested data and the type of the data.

Furthermore, if transmission data (RLC-PDU) is input from the MAC sublayer 130 to the RLC sublayer 120, the buffer 121, the ARQ processing unit 122, and the RLC control unit 123 performs a process described above in the reverse order.

In the following, the MAC sublayer 130 will be described. The MAC sublayer 130 is a layer that performs scheduling of data between each RLC sublayer mapped onto multiple physical channels, multiplexes data from the RLC sublayer 120, and transmits the multiplexed data as an MAC-PDU to layer 1 corresponding to the lower layer. If the MAC sublayer 130 obtains data from layer 1, the MAC sublayer 130 performs a process in the reverse order that is performed when the transmission is performed.

As illustrated in the lower part of FIG. 2, the MAC sublayer 130 has a multiplexing unit 131 and a scheduler 132. The multiplexing unit 131 obtains RLC-PDUs from each RLC sublayer 120 of each logical channel, multiplexes the obtained RLC-PDUs to create an MAC-PDU, and outputs, via layer 1, the created MAC-PDU to another communication device that is the destination of the transmission data.

In particular, if the multiplexing unit 131 receives, from the PDCP sublayer 110, space insufficient information indicating that available storage space of the buffer 111 of the PDCP sublayer 110 is insufficient, the space insufficient information is created by the MAC-PDU and is transmitted to another communication device that is the destination of the transmission data.

Furthermore, if the multiplexing unit 131 receives an MAC-PDU from another communication device and if that MAC-PDU contains space-insufficient dissolution information related on a buffer in a PDCP sublayer of a source communication device of that MAC-PDU, the multiplexing unit 131 outputs that space-insufficient dissolution information to the scheduler 132.

The scheduler 132 manages the amount of data of each RLC-PDU received from each logical channel and notifies each RLC sublayer of each logical channel of the necessary volume of the data. In general, the scheduler 132 transmits, to the RLC control unit 123 of the RLC sublayer 120, a data request that request transmission data (RLC-PDU) including both the user data and the control data.

However, the scheduler 132 is configured such that, if the scheduler 132 receives the space insufficient information from the multiplexing unit 131, the scheduler 132 transmits, to the RLC control unit 123 of the RLC sublayer 120, a data request for transmission of transmission data (RLC-PDU) that contains the control data but does not contains the user data.

By transmitting such a data request to the RLC sublayer 120, the MAC sublayer 130 obtains the transmission data (RLC-PDU) in which the user data is excluded from the RLC sublayer 120. Accordingly, the MAC sublayer 130 transmits, to another communication device, the transmission data (MAC-PDU) that contains the control data excluding the user data.

In this way, when the MAC sublayer 130 according to the first embodiment receives transmission data, if the transmission data contains space insufficient information related on a buffer in another communication device that transmits the subject transmission data, the MAC sublayer 130 transmits the control data but does not transmit the user data to the communication device that transmits the subject transmission data.

Because the transmission of the user data from the other communication device is stopped, in the communication device that transmits the transmission data containing the space insufficient information, the amount of transmission data stored in the PDCP sublayer gradually decreases, and thus the communication device can newly receive transmission data including user data.

Furthermore, because transmission of the control data is not stopped even if transmission of the user data from another communication device is stopped, the communication device that transmits the transmission data containing the space insufficient information can confirm, in accordance with the received control data, the delivery of transmission data that is transmitted from its own device. Accordingly, that communication device can continuously perform the transmission without stopping the transmission of the transmission data to the other communication device.

In contrast, if the scheduler 132 receives the space-insufficient dissolution information from the multiplexing unit 131, the scheduler 132 transmits, to the RLC control unit 123 in the RLC sublayer 120, a data request for transmission of the transmission data (RLC-PDU) containing, as usual, both the user data and the control data.

In the following, an example of the sequence of data transmission/reception performed between the user terminal 100 and the base station 200 each having the above-described layer 2 will be described with reference to FIG. 3. The user terminal 100 and the base station 200 each include a computer that has a central processing unit (CPU), a read only memory (ROM), and a random access memory (RAM). Each CPU in the computer reads, from the ROM, a communication program according to the first embodiment and executes the communication program by using the RAM as an operation region, thereby the data transmission/reception illustrated in FIG. 3 is performed between the user terminal 100 and the base station 200.

Figure 3:
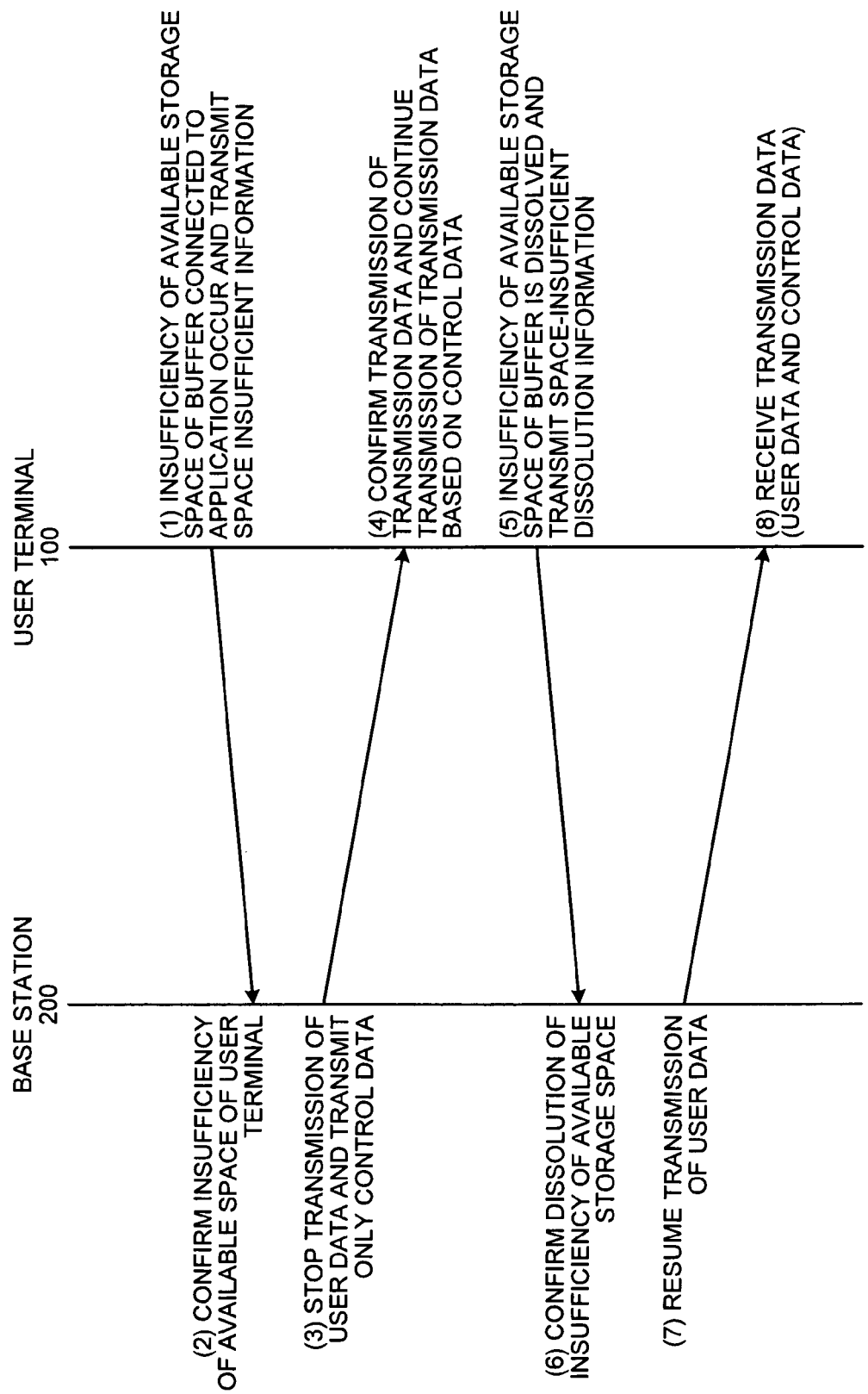
FIG. 3 is a sequence diagram illustrating a process performed in the user terminal and the base station according to the first embodiment.

As illustrated in FIG. 3, if a certain user terminal 100 is connected to the low throughput application 500 and available storage space of the buffer 111 of the PDCP sublayer 110 is insufficient, the user terminal 100 transmits the space insufficient information to the base station 200 (1).

If the base station 200 receives the space insufficient information from the user terminal 100, the base station 200 confirms that available storage space of the buffer 111 in the user terminal 100 is insufficient (2), temporarily stops the transmission of the user data to the user terminal 100 that transmits the space insufficient information, and transmits only the control data (3).

In accordance with the control data received from the base station 200, the user terminal 100 confirms the delivery of the transmission data that is transmitted from its own device (the user terminal 100) to the base station 200 and continues the transmission of the transmission data to the base station 200 (4).

Then, if insufficiency of available storage space of the buffer 111 of the PDCP sublayer 110 is dissolved (5), the user terminal 100 transmits the space-insufficient dissolution information to the base station 200.

If the base station 200 receives the space-insufficient dissolution information, the base station 200 confirms that the insufficiency of available storage space of the buffer 111 of the user terminal 100 has been dissolved (6) and then resumes the transmission of the user data to the user terminal 100 that is temporarily stopped. Accordingly, the user terminal 100 receives, from the base station 200, the transmission data containing both the user data and the control data.

As described above, with the communication system S according to the first embodiment, even if a temporary storing unit (here, the buffer 111) in a communication device (here, the user terminal 100) that receives transmission data stores therein transmission data whose amount exceeds a predetermined amount, a communication device (here, the base station 200) that transmits the transmission data stops the transmission of the user data but does not stop the transmission of the control data. Accordingly, the communication device (here, the user terminal 100) that receives the transmission data can confirm, using the received control data, the delivery of transmission data that is transmitted from its own device. Therefore, there is no need to unnecessarily stop the transmission of the transmission data from the communication device (here, the user terminal 100) that receives the transmission data to the communication device (here, the base station 200) that transmits the transmission data.

Furthermore, in the first embodiment described above, the user terminal 100 and the base station 200 each include layer 2 that includes the buffer monitoring unit 115a and the scheduler 132 that sends, to the RLC layer 120 when space insufficient information is received, a transmission request for transmission data excluding the user data. For example, if available storage space of the buffer 111 of the PDCP layer of the base station 200 is insufficient, transmission data including the control data but excluding the user data is transmitted from the user terminal 100 to the base station 200.

Accordingly, as in a case in which a base station is connected to a low throughput IP, network, even when available storage space of the buffer 111 of the base station 200 is insufficient, there is no need for the base station 200 to unnecessarily stop the transmission of the transmission data (the user data and the control data) to the user terminal 100.

In the first embodiment, the user terminal 100 and the base station 200 each include layer 2 that includes the buffer monitoring unit 115a and the scheduler 132 that sends, to the RLC layer 120 when space insufficient information is received, a transmission request for transmission data excluding the user data. However, they are not necessarily arranged to both communication devices.

Specifically, the buffer monitoring unit 115a is arranged only in a communication device, i.e., either the user terminal 100 or the base station 200, in which available storage space of the buffer 111 of the PDCP layer 110 is likely to be insufficient, and space insufficient information is transmitted to the other end of the communication device when the insufficiency of available storage space occurs.

The buffer monitoring unit 115a is not arranged in the communication device that receives the space insufficient information. When the space insufficient information is received, transmission data excluding the user data is transmitted to the source communication device that transmits the space insufficient information. Even if the communication system S is configured in this way, in a similar manner as described above, there is no need to unnecessarily stop the transmission of the transmission data from the receiving-end communication device that receives the transmission data to the transmission-end communication device.

In the first embodiment, if the scheduler 132 of the MAC layer 130 receives the space insufficient information, a data request for transmission data excluding the user data is transmitted to the RLC control unit 123 of the RLC layer 120; however the configuration is not limited thereto. For example, with another configuration, it is also possible to transmit the transmission data excluding the user data to a communication device in which the insufficiency of available storage space occurs in the buffer 111.

For example, if the MAC layer 130 receives the space insufficient information from the other communication device, a data request that is transmitted from the scheduler 132 to the RLC layer 120 is stopped. Then, if the RLC layer 120 does not receive a data request from the MAC layer 130 at a predetermined timing or does not receive a subsequent data request even when a predetermined time has elapsed after the previous data request, the transmission data excluding the user data is transmitted to the MAC layer 130. Even if the communication system S is configured in this way, in a similar manner as described above, there is no need to unnecessarily stop the transmission of the transmission data from the receiving-end communication device that receives the transmission data to the transmission-end communication device.

Furthermore, in the first embodiment, if the scheduler of the MAC layer 130 receives a space-insufficient dissolution signal, the transmission data containing both the user data and the control data to the RLC layer 120 is requested, thereby the RLC layer 120 resumes the transmission of the user data; however the configuration is not limited thereto. For example, by using another configuration, it is also possible for the RLC layer 120 to resume the transmission of the user data.

For example, if the RLC layer 120 does not receive a data request, from the MAC layer 130, for transmission of the user data even when a predetermined period has elapsed after the commencement of the transmission of the transmission data excluding the user data, it is also possible for the RLC layer 120 to resume the transmission of the user data to the MAC layer 130.

[b] Second Embodiment

In the following, a communication system, a communication device, and a communication method according to a second embodiment of the present invention will be described. In the first embodiment described above, a case has been described in which the present invention is applied to the communication system that transmits/receives transmission data between the user terminal 100 and the base station 200. In the second embodiment, a case will be described in which the present invention is applied to a communication system in which a relay station 700 is arranged between the base station 200 and the user terminal 100 in the communication system according to the first embodiment, and transmission data is transmitted between the relay station 700 and the user terminal 100. In the following description, elements that have the same configuration as in the first embodiment are assigned the same reference numerals, and a description thereof in detail is omitted.

Figure 4:
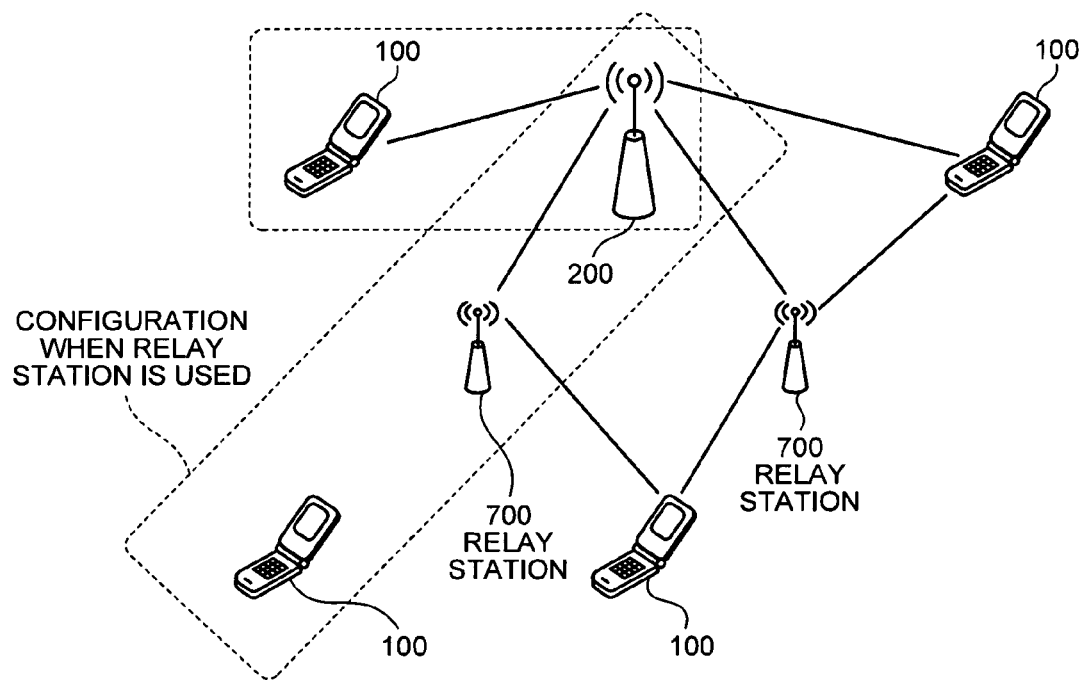
FIG. 4 is a schematic diagram illustrating a communication system according to a second embodiment.

As illustrated in FIG. 4, the communication system according to the second embodiment includes the user terminals 100, the base station 200, and relay stations 700 that relay the transmission data transmitted/received between the user terminal 100 and the base station 200.

Figure 5:
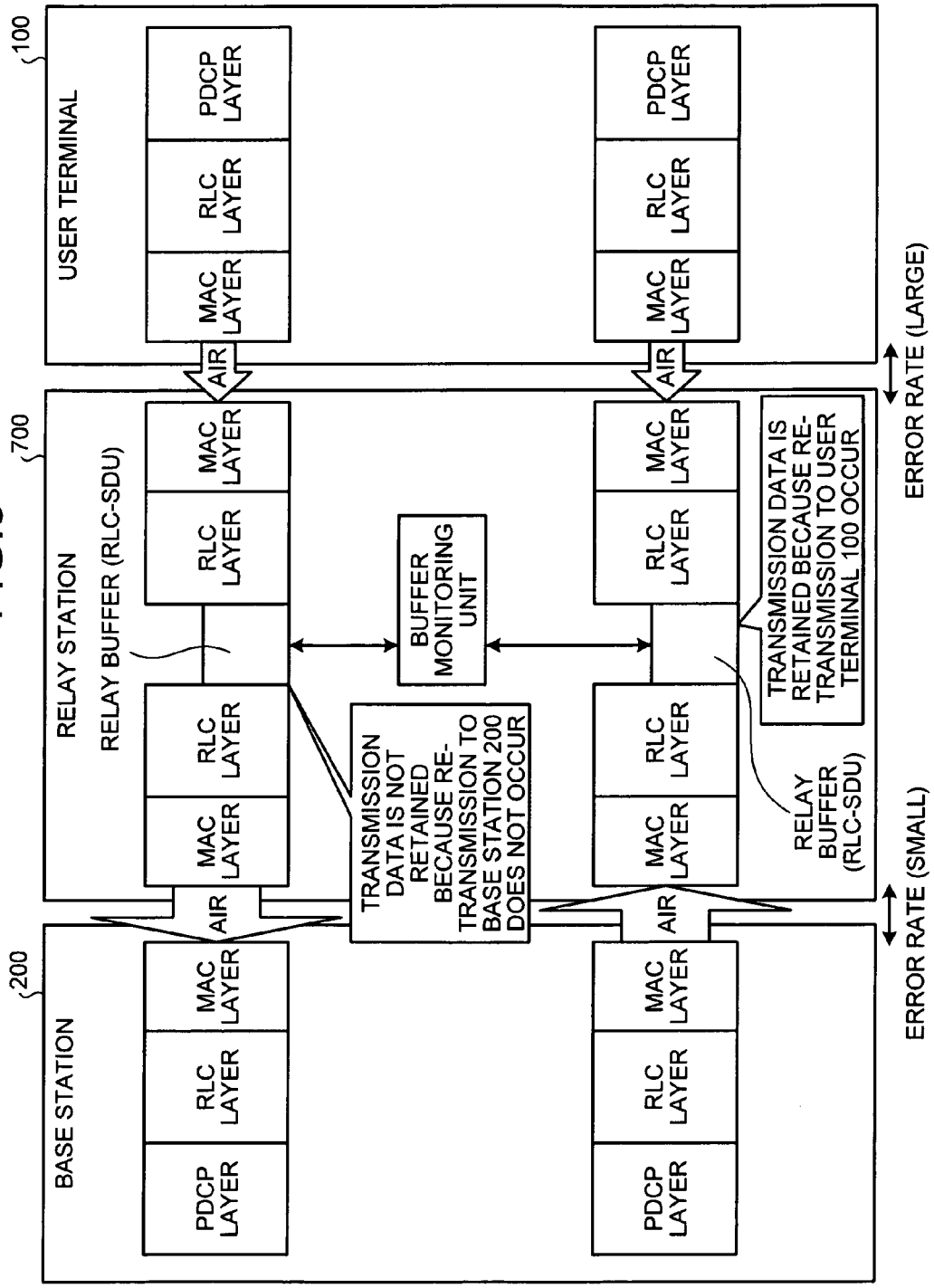
FIG. 5 is a schematic diagram illustrating the flow of transmission data in a communication system according to the second embodiment.
Figure 7:
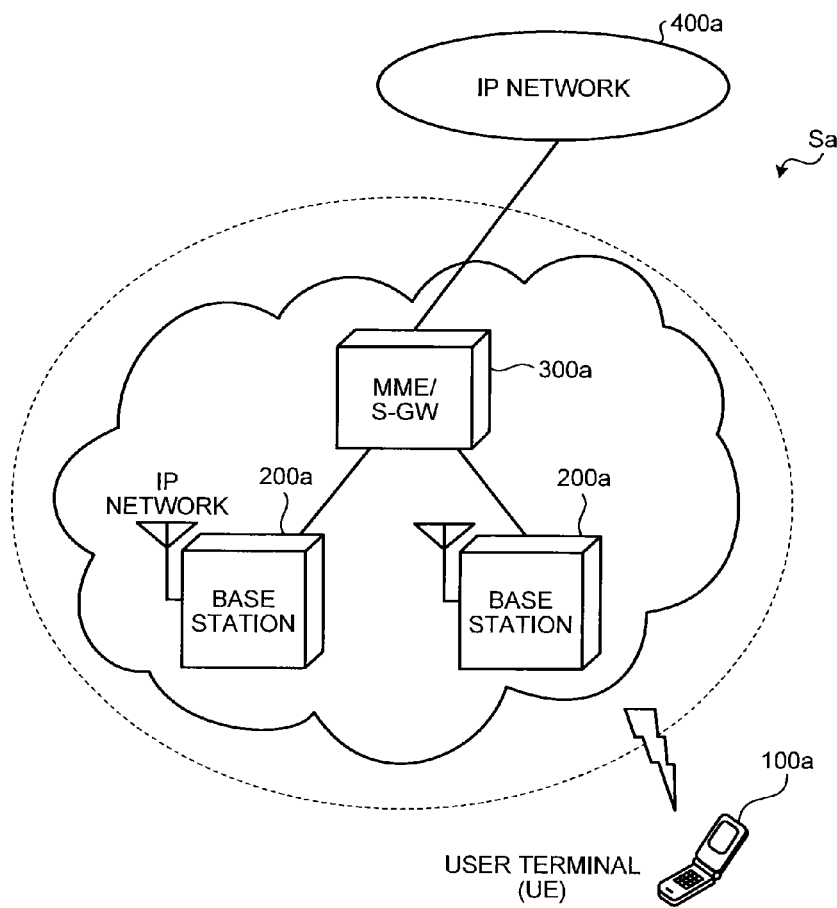
FIG. 7 is a schematic diagram illustrating a conventional communication system.
Figure 8:
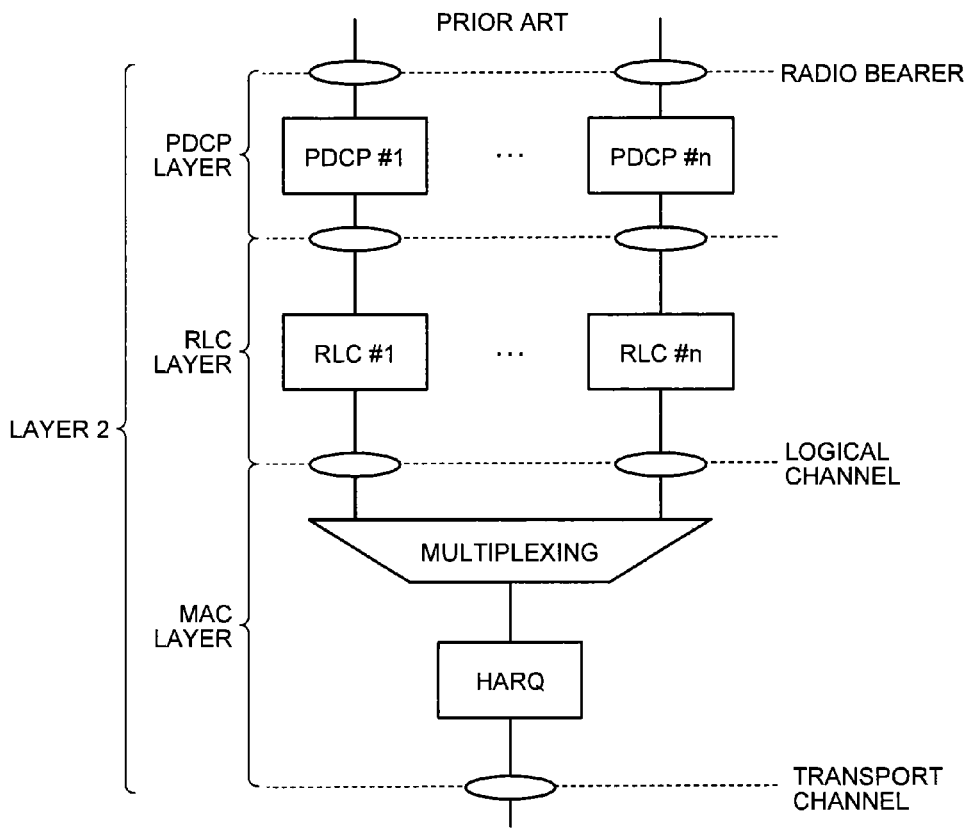
FIG. 8 is a schematic diagram illustrating the conventional layer 2.
Figure 9:
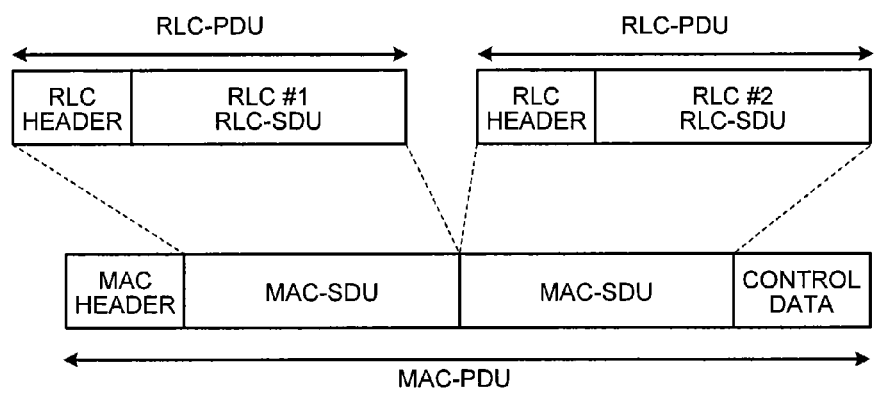
FIG. 9 is a schematic diagram illustrating the configuration of transmission data in layer 2.
Figure 10:
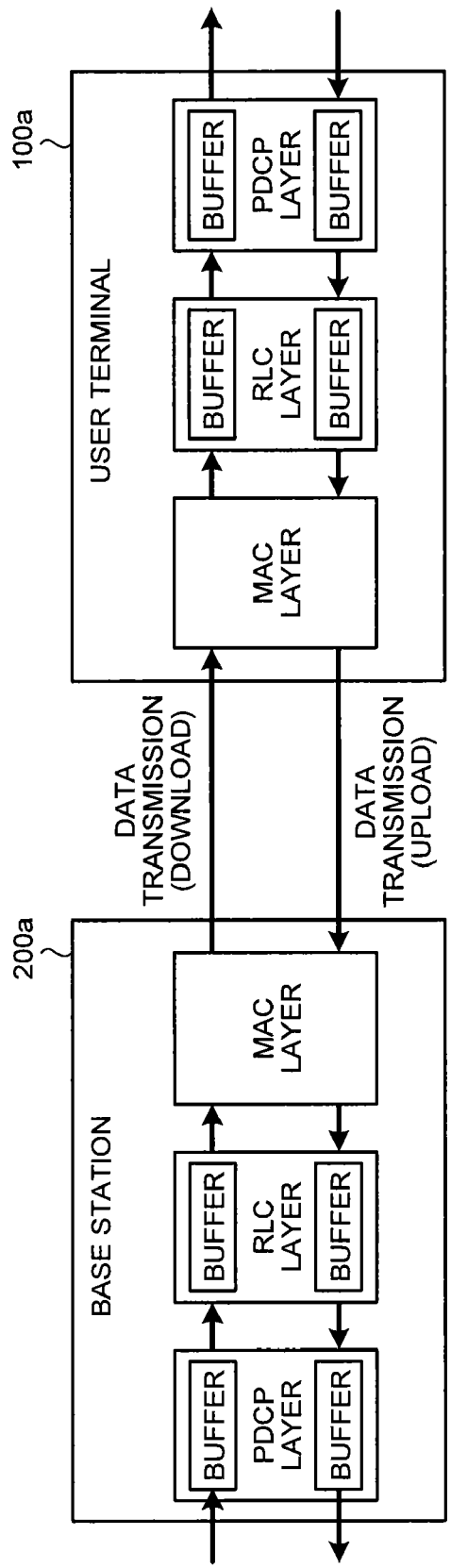
FIG. 10 is a schematic diagram illustrating the flow of transmission data in the conventional communication system.
Figure 11:
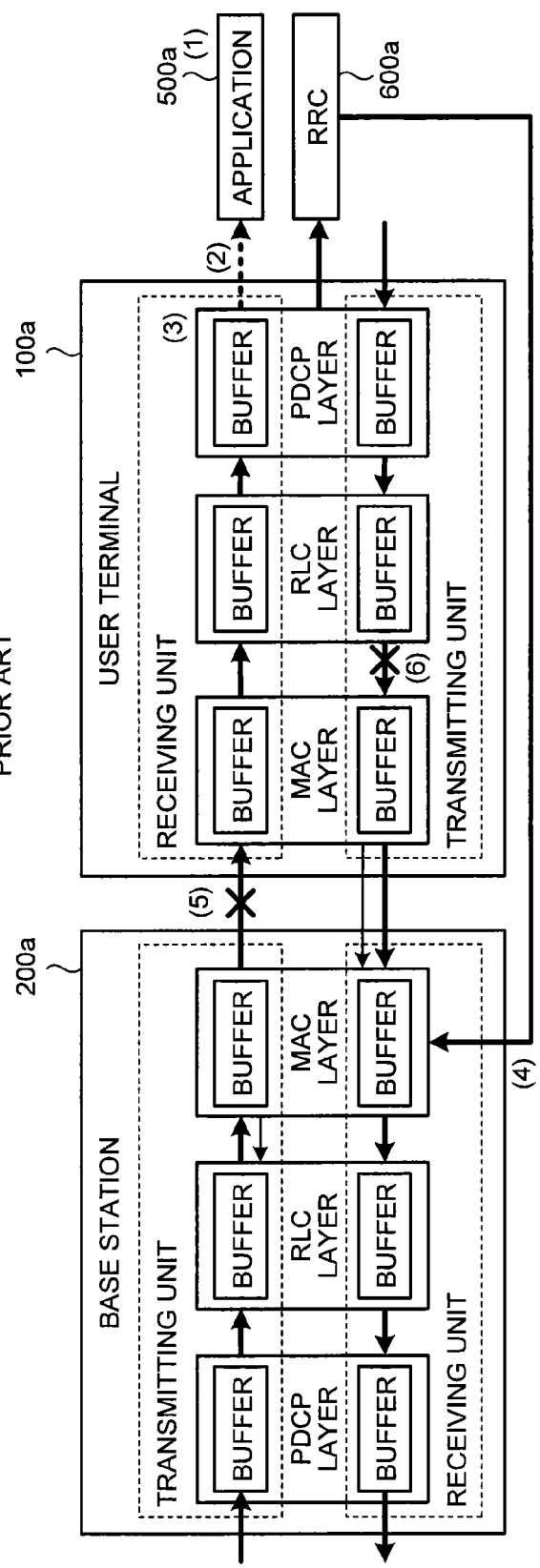
FIG. 11 is a schematic diagram illustrating the flow of transmission data in the conventional communication system.

FIG. 5 is a schematic diagram illustrating the simplified configuration of the user terminal 100, the base station 200, and the relay station 700 according to the second embodiment. As illustrated in FIG. 7, in the similar manner as in the first embodiment, the user terminal 100 and the base station 200 each have layer 2 that includes a PDCP layer, an RLC layer; and an MAC layer.

Because the relay stations 700 are devices that relay transmission data (MAC-PDU) that is transmitted from each of the MAC layers of the user terminal 100 and the base station 200, the relay stations 700 each include both the MAC layer and the RLC layer. However, each of the relay stations 700 does not include the PDCP layer because it is not connected to an IP network.

Furthermore, the relay station 700 includes relay buffers that temporarily store therein transmission data transmitted from the user terminal 100 or the base station 200. The relay buffers each store therein the transmission data (MAC-PDU) received from the MAC layer by converting it to an RLC-SDU in the RLC layer. Furthermore, the relay station 700 includes a buffer monitoring unit that monitors the amount of transmission data stored in the relay buffers.

In the communication system having this configuration, because the positional relation between the base station 200 and the relay station 700 is constant, a radio wave environment (Air) or the like between the base station 200 and the relay station 700 is relatively well maintained. Accordingly, between the base station 200 and the relay station 700, the error rate (occurrence of a transmission/reception error) of the transmission data at the time of transmission is relatively low.

In contrast, because the user terminal 100 is a mobile communication device, such as a mobile phone, the positional relationship with the relay station 700 frequently changes. Accordingly, the error rate of the transmission data between the relay station 700 and the user terminal 100 at the time of transmission is relatively large depending on the position of the user terminal 100.

The relay station 700 is configured such that, when it transmits the transmission data to the base station 200 or the user terminal 100, if a receive error of the transmission data occurs in the receiving-end communication device of the transmission data, the relay station 700 re-transmits the transmission data to the transmission-end communication device. Accordingly, even if the relay station 700 transmits the transmission data, the relay station 700 does not immediately delete the transmission data from the relay buffer but delete the transmission data from the relay buffer after the relay station 700 confirms the delivery of that transmission data.

As described above, the error rate of the transmission data at the time of transmission between the relay station 700 and the base station 200 is low, whereas the error rate between the relay station 700 and the user terminal 100 is higher than that between the relay station 700 and the base station 200.

Accordingly, as illustrated in the upper portion of FIG. 5, if the transmission data is transmitted from the user terminal 100 to the base station 200 via the relay station 700, the transmission data is less frequently re-transmitted from the relay station 700 to the base station 200. Accordingly, because the transmission data is deleted, one by one, from the relay buffer in the relay station 700, transmission data is less likely to be retained in the relay buffer.

In contrast, as illustrated in the lower portion of FIG. 5, if the transmission data is transmitted from the base station 200 to the user terminal 100 via the relay station 700, the transmission data is relatively often re-transmitted from the relay station 700 to the user terminal 100.

In this way, if the number of times the transmission data is re-transmitted from the relay station 700 to the user terminal 100, transmission data that cannot delete is retained in the relay buffer.

Figure 6:
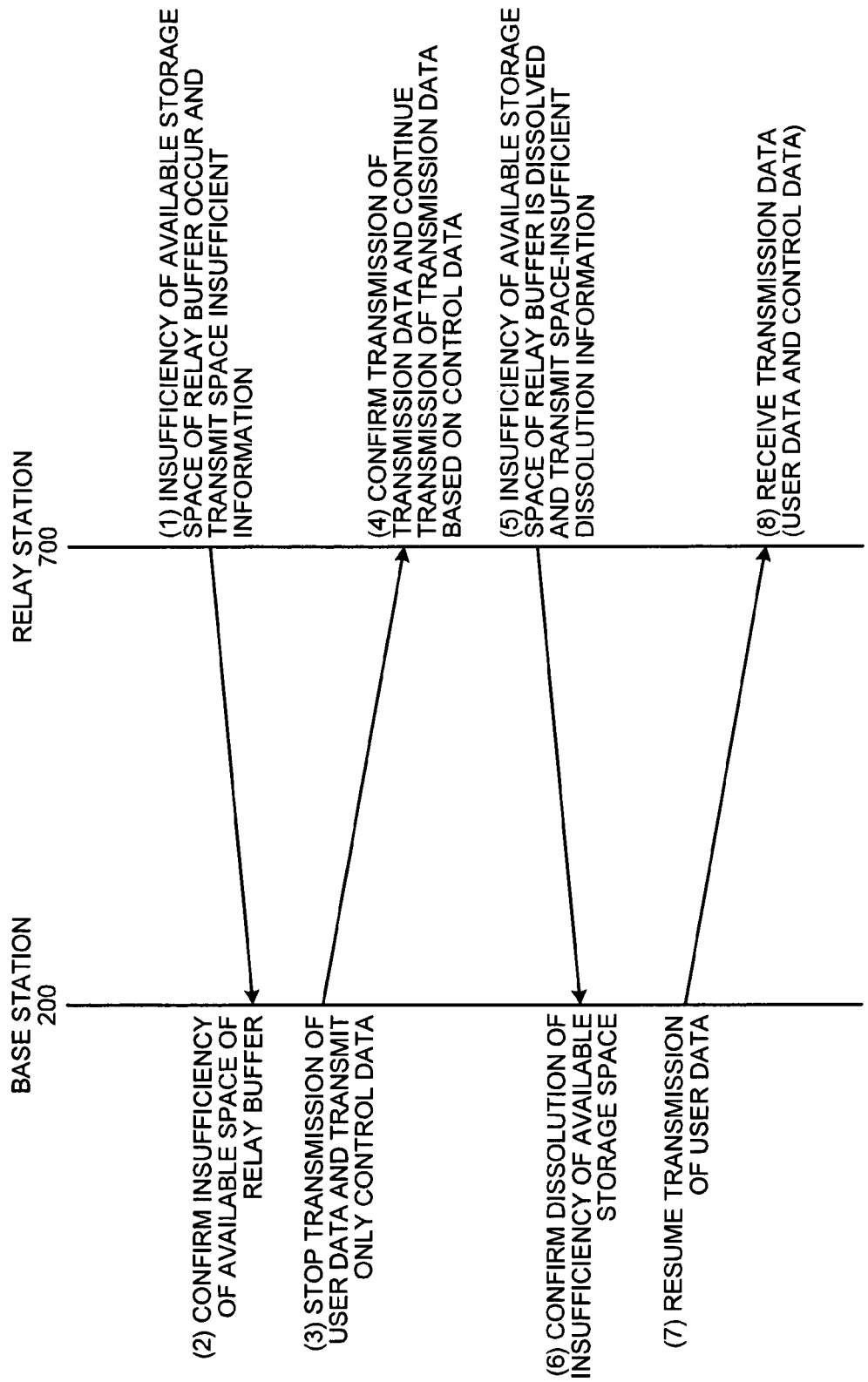
FIG. 6 is a sequence diagram illustrating a process performed in a relay station and a base station according to the second embodiment.

The communication system according to the second embodiment is configured such that, if the transmission data is retained in the relay buffer in the relay station 700 in this way and if the buffer monitoring unit in the relay station 700 detects the amount of transmission data stored in the relay buffer exceeds a predetermined value, by both the relay station 700 and the base station 200 executing each process in accordance with the sequence illustrated in FIG. 6, the transmission of the transmission data between the relay station 700 and the base station 200 can be prevented from being unnecessarily stopped. The relay station 700 and the base station 200 each include a computer that has a central processing unit (CPU), a read only memory (ROM), and a random access memory (RAM). Each CPU in the computer reads, from the ROM, a communication program according to the second embodiment and executes the communication program by using the RAM as an operation region, thereby the data transmission/reception illustrated in FIG. 6 is performed between the relay station 700 and the base station 200.

As illustrated in FIG. 6, if the buffer monitoring unit in the relay station 700 detects that available storage space of the relay buffer is insufficient, the MAC layer of the relay station 700 transmits space insufficient information to the MAC layer of the base station 200 (1).

By receiving the space insufficient information, the base station 200 confirms that the available storage space of the relay buffer in the relay station 700 becomes insufficient (2). Then, the MAC layer of the base station 200 sends, to the RLC layer of the base station 200, a data request for transmission of transmission data that includes the control data excluding the user data.

If the RLC layer of the base station 200 receives the data request, the RLC layer stops the transmission of the user data and then transmits the transmission data that contains only the control data to the relay station 700 via the MAC layer (3). If the relay station 700 receives the transmission data, the relay station 700 confirms, in accordance with the control data contained in the received transmission data, the delivery of the transmission data that is transmitted from its own device (here, the relay station 700) to the base station 200 and continues transmission of the transmission data to the base station 200 (4).

Then, if the buffer monitoring unit detects that the insufficiency of available storage space of the relay buffer is dissolved, the relay station 700 transmits, to the base station 200, space-insufficient dissolution information indicating that status (5).

By receiving the space-insufficient dissolution information, the base station 200 confirms that the insufficiency of available storage space of the relay buffer in the relay station 700 is dissolved (6) and then resumes the transmission of the user data from the RLC layer of the base station 200 to the relay station 700 via the MAC layer (7). Accordingly, the relay station 700 again receives the transmission data containing both the user data and the control data from the base station (8).

In this way, in the communication system according to the second embodiment, if the relay station 700 is arranged between the base station 200 and the user terminal 100, even when transmission data whose amount exceeds a predetermined value is stored in the relay buffer in the relay station 700, the transmission of the user data from the base station 200 to the relay station 700 is temporarily stopped, but it is possible to continue the transmission of the control data from the base station 200 to the relay station 700.

Accordingly, even for the time period during which the transmission of the user data from the base station 200 to the relay station 700 is stopped, the relay station 700 can confirm, in accordance with the control data received from the base station, the delivery of the transmission data that is transmitted from its own device (the relay station 700) to the base station 200 and that includes both the user data and the control data. Therefore, the transmission of the transmission data to the base station 200 is not unnecessarily stopped.

With a communication system according to an embodiment, even if a temporary storing unit in a communication device that receives transmission data stores therein the transmission data whose amount exceeds a predetermined amount, a communication device that transmits the transmission data stops the transmission of the user data but does not stop the transmission of the control data. Accordingly, the communication device that receives the transmission data confirms the delivery of the transmission data that is transmitted from its own device using the received control data. Therefore, there is no need to unnecessarily stop the transmission of the transmission data from the receiving-end communication device that receives the transmission data to the transmission-end communication device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication system comprising:
    a first communication device that transmits transmission data containing user data and control data; and
    a second communication device that receives the transmission data from the first communication device, wherein
    the second communication device includes
        a temporary storing unit that temporarily stores therein the received transmission data, and
        a space-insufficient-information transmitting unit that transmits, when an amount of the transmission data stored in the temporary storing unit exceeds a first threshold, space insufficient information indicating that available storage space of the temporary storing unit is insufficient to the first communication device, and
    the first communication device includes
        a transmission control unit that transmits, when receiving the space insufficient information from the second communication device, transmission data excluding the user data from the transmission data to the second communication device, and that resumes, when receiving space-insufficient dissolution information from the second communication device, transmission of the user data.

2. The communication system according to claim 1, wherein
    the first communication device further includes a protocol stack that has a lower sublayer and an upper sublayer, the lower sublayer transmitting the transmission data to the second communication device, the upper sublayer transmitting the transmission data to the lower sublayer in accordance with a request from the lower sublayer, and the lower sublayer sends, when receiving the space insufficient information, a transmission request for the transmission data excluding the user data to the upper sublayer.

3. The communication system according to claim 1, wherein the first communication device further includes a protocol stack that has a lower sublayer and an upper sublayer, the lower sublayer transmitting the transmission data to the second communication device, the upper sublayer transmitting the transmission data to the lower sublayer in accordance with a request from the lower sublayer, and the upper sublayer transmits, when not receiving the transmission request for the transmission data from the lower sublayer at a predetermined timing, the transmission data excluding the user data to the lower sublayer.

4. A communication method of receiving and transmitting transmission data containing user data and control data, between a first communication device and a second communication device, the communication method comprising:

receiving, by the second communication device, the transmission data from the first communication device, temporarily storing, in a temporary storing unit, the transmission data received from the first communication device, transmitting, when an amount of the transmission data stored in the temporary storing unit exceeds a first threshold, space insufficient information indicating that available storage space of the temporary storing unit is insufficient to the first communication device, and transmitting, when the first communication device receives the space insufficient information, the transmission data excluding the user data, and resuming, when the first communication device receives space-insufficient dissolution information from the second communication device, transmission of the user data.

5. A communication device that receives and transmits, with another communication device, transmission data containing user data and control data, the communication device comprising a transmission control unit that transmits, when receiving space insufficient information indicating that available storage space of a temporary storing unit that temporarily stores therein the received transmission data is insufficient from the another communication device, the transmission data excluding the user data to the another communication device.

6. A computer-readable, non-transitory medium storing a communication program for receiving and transmitting transmission data containing user data and control data between a first communication device and a second communication device, the communication program causing a computer to execute a process comprising:

when the transmission data is received from the first communication device, storing, in a temporary storing unit, the received transmission data, and transmitting, when an amount of the transmission data stored in the temporary storing unit exceeds a first threshold, space insufficient information indicating that available storage space of the temporary storing unit is insufficient to the first communication device, and when the transmission data is transmitted to the second communication device, transmitting, when the first communication device receives the space insufficient information from the first communication device, the transmission data excluding the user data to the communication device of a destination of the transmission data, and resuming, when the first communication device receives space-insufficient dissolution information from the second communication device, transmission of the user data.

* * * * *